Nov. 5, 1929.   J. ANDERSON   1,734,608
KETTLE COVER
Filed Sept. 28, 1928
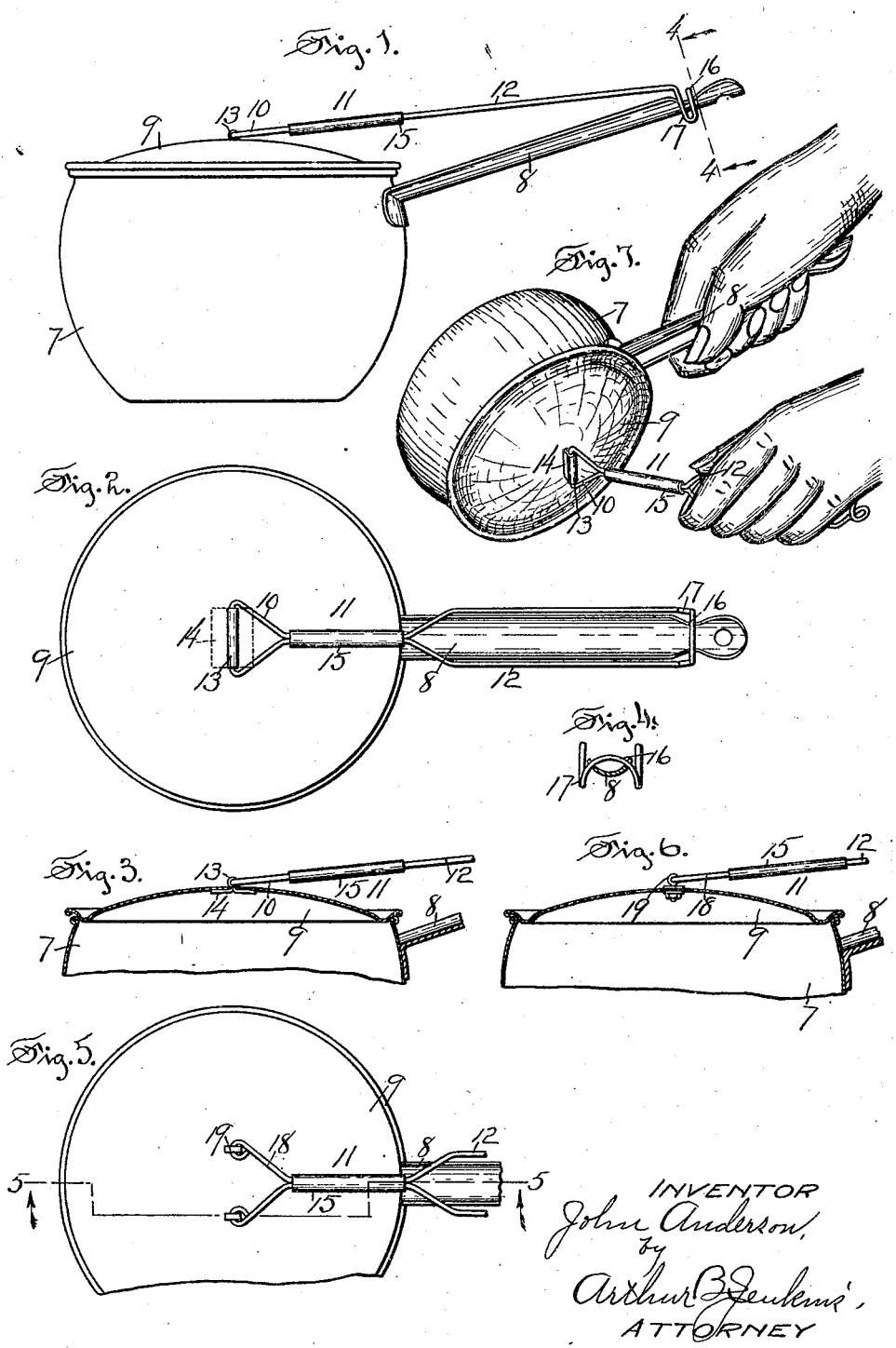

Patented Nov. 5, 1929

1,734,608

UNITED STATES PATENT OFFICE

JOHN ANDERSON, OF PORTLAND, CONNECTICUT

KETTLE COVER

Application filed September 28, 1928. Serial No. 308,983.

My invention relates to the class of devices employed to close the mouths of cooking utensils such as pots, kettles and the like and an object of my invention, among others, is the provision of means whereby a cover may be securely held in place while the kettle is being drained, the device being particularly convenient in use and with little liability of burning the user.

One form of my improved cover, in the construction and use of which the objects herein set out, as well as others, may be attained, is illustrated in the accompanying drawings, in which—

Figure 1 is a view in side elevation showing a kettle having my improved cover applied thereto.

Figure 2 is a top view of the same.

Figure 3 is a view in vertical central section through the upper part of a kettle and through my improved cover.

Figure 4 is a view in section on a plane denoted by the dotted line 4—4 of Figure 1.

Figure 5 is a top view of a portion of a kettle and of a cover illustrating a slightly different form of the invention.

Figure 6 is a view in section on a plane denoted by the dotted line 5—5 of Figure 4.

Figure 7 is a view illustrating one manner of use of the device.

In the accompanying drawings the numeral 7 denotes a pot or kettle of any ordinary form and construction having a common form of handle 8 secured to and projecting therefrom and with a cover 9 fitting the upper edge and closing the opening into the kettle.

In the cooking of vegetables or other materials, it is often desired to drain the water from the kettle while retaining the material therein, and the cover is commonly employed as a means for preventing the material from falling out when the kettle is tipped to drain the water therefrom. It is the purpose of my present invention to provide means whereby the cover may be securely held in place at such times without danger of its slipping out of place and to this end I provide a holder that comprises a loop 10 at one end, a shank 11 and a handle 12. The loop, in one form of the device, is pivotally attached to the tubular portion 13 of a clip 14 attached to the cover in a manner common to structures of this class.

In order to prevent the handle of the holder from slipping from engagement with the handle 8 of the kettle, I provide means at the outer end of the holder handle for securely engaging the kettle handle. In the structure herein shown the cover holder is made from wire formed into the loop 10 and closed together at the shank 11 where it is held by a sleeve 15. The wires are separated from the sleeve 15 to the outer end of the handle, as shown in Figure 2 of the drawings, and at the outer end of the holder handle the wire is formed into a retainer in the form of a bow 16. In forming this bow the wire is bent downwardly from the handle 12 and then backwardly as shown in Figure 1 forming side parts or retainers 17 that lie on opposite side of the handle 8 and prevent any sidewise movement and consequent disengagement of the holder handle from the kettle handle.

The cover holder as thus constructed provides means for securely retaining the cover in place while the kettle is being tipped for the purpose of draining the liquid contents therefrom, and should it be found that the weight of the kettle and its contents are such as to prevent ready handling of the kettle with one hand, the handle 12 of the holder may be disengaged from the handle and swung to an outward position, and while the kettle handle is held by one hand the other hand of the user may grasp the handle 12 and hold the cover in place, and this will, at the same time, aid in supporting the kettle, both hands of the user in such case, being employed for this purpose.

In that form of the device shown in Figures 4 and 5, the shank and handle of the holder are constructed as hereinbefore described. Instead of the loop however, branches 18 are formed at the end of the holder handle and the ends of these branches are looped to engage rings 19 secured to the cover as by means of nuts and as shown in Figures 4 and 5 of the drawings.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. In combination with a kettle cover, a cover handle attached thereto and projecting therefrom sufficiently to extend along the kettle handle, said cover handle being formed of wire in two separated lengths bent downwardly to engage opposite sides of the kettle handle and prevent lateral movement of the cover handle independently of the kettle handle.

2. In combination with a kettle cover, a cover handle attached thereto and projecting therefrom sufficiently to extend along the kettle handle, said cover handle being formed of wire in two separated lengths and each length bent downwardly and backwardly on itself to form lips at the outer end of the cover handle and spaced apart to engage opposite sides of the kettle handle and prevent lateral movement of the cover handle independently of the kettle handle.

JOHN ANDERSON.